Feb. 5, 1952 H. G. KEHBEL 2,584,592

ELECTRIC OSCILLATORY CIRCUIT DEVICE

Filed Oct. 5, 1949 2 SHEETS—SHEET 1

INVENTOR.

Heinz Georg Kehbel.

BY

C. M. Avery

ATTORNEY

Feb. 5, 1952 H. G. KEHBEL 2,584,592

ELECTRIC OSCILLATORY CIRCUIT DEVICE

Filed Oct. 5, 1949 2 SHEETS—SHEET 2

INVENTOR.
Heinz Georg Kehbel.
BY
C. M. Avery
ATTORNEY

Patented Feb. 5, 1952

2,584,592

UNITED STATES PATENT OFFICE 2,584,592

ELECTRIC OSCILLATORY CIRCUIT DEVICE

Heinz Georg Kehbel, Bavaria, Germany, assignor to Siemens-Schuckertwerke Aktiengesellschaft, Berlin-Siemensstadt, Germany, a corporation of Germany Application October 5, 1949, Serial No. 119,620
In Germany October 1, 1948

13 Claims. (Cl. 250—40)

The invention relates to electric oscillatory circuits, for instance, for high-frequency transmitting, receiving, and measuring apparatus.

It is an object of the invention to provide an electric oscillatory circuit device of a desired and predetermined frequency-temperature characteristic. A more specific object of the invention is to devise an oscillatory device whose natural frequency is independent of changes in temperature. Another more specific object is to provide a circuit device whose frequency varies with the temperature in according with a desired and predetermined law of change.

To achieve these objects, and in accordance with the invention, the capacitor and the inductance coil, which are electrically connected with each other and form the frequency determining components of an oscillatory circuit device, are equipped with respective dielectric bodies of which one has a positive temperature coefficient of its dielectric constant while the corresponding temperature coefficient of the other body is negative. According to another feature of the invention, the capacitor of the oscillatory circuit has a dielectric consisting of a ceramic material with a positive temperature coefficient such as ceramic magnesuim silicate materials, while the conductor of the oscillator coil is disposed on a carrier body of ceramic material having a negative temperature coefficient, such as titanium dioxide or titanium dioxide containing material. Preferably, the dielectric losses of the dielectrics in capacitor and coil should be low and their dielectric constants should be high, as is the case with the mentioned ceramic materials. In such an oscillatory device, the temperature-responsive (thermo-positive) variation of the capacitance component is counteracted by the opposingly effective (thermo-negative) variation in the distributed capacitance of the inductance component. The degree of compensation thus obtained can be adjusted by correspondingly selecting the ratio of the distributed capacitance of the inductance coil to the total capacitance of the oscillatory circuit.

The required distributed capacitance of the inductance component is obtained with cylindric coil carriers by correspondingly selecting the winding pitch, and with flat coils by selecting a proper distance between the winding turns. Also the cross-sectional shape and dimensions of the coil conductor can be chosen or varied to obtain the desired value of distributed capacitance.

An adjustment or regulation of the distributed capacitance of the inductance component can also be effected by displaceably inserting another dielectric body into the field of the distributed capacitance. This inserted body consists preferably also of a ceramic material with a high dielectric constant and low dielectric losses and may be non-metallized or at least partially metal coated. The shape of the insert body is adapted to that of the coil carrier, for instance, the body may have a hollow or solid cylindric shape to be inserted into the interior of the coil carrier or to be placed around the carrier.

The foregoing and other objects and features of the invention will be apparent from the following description in conjunction with the drawing, in which:

Figures 1 and 2 are part-sectional illustrations of two respective cylindrical coil structures applicable in oscillatory circuit devices according to the invention;

Fig. 3 is a top view and Fig. 3*a* a corresponding cross section of a flat inductance coil also applicable as a component of a device according to the invention;

Fig. 4 is a top view of another suitable coil structure of flat shape, while Fig. 4*a* shows a cross section along the plane denoted in Fig. 4 by A—B, and Fig. 4*b* a cross section in the plane denoted in the Fig. 4 by C—D;

Fig. 5 shows schematically an oscillatory circuit device according to the invention composed of an inductance component as shown in any of the other figures and of a capacitor electrically connected with the coil;

Figure 6:
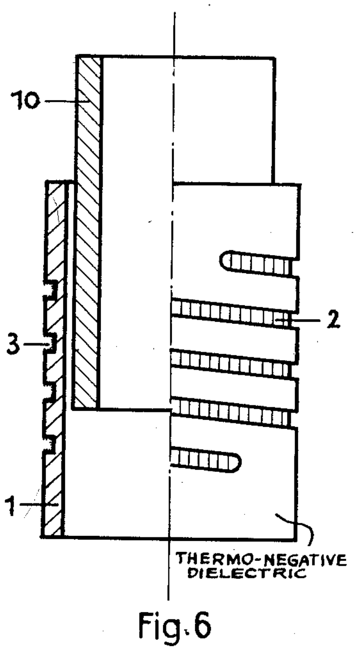
Figure 7:
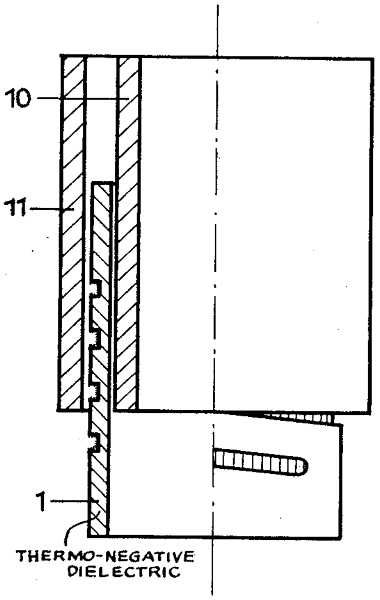
Figure 8:
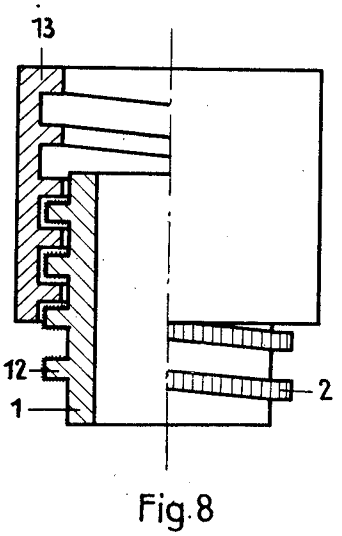
Figure 9:
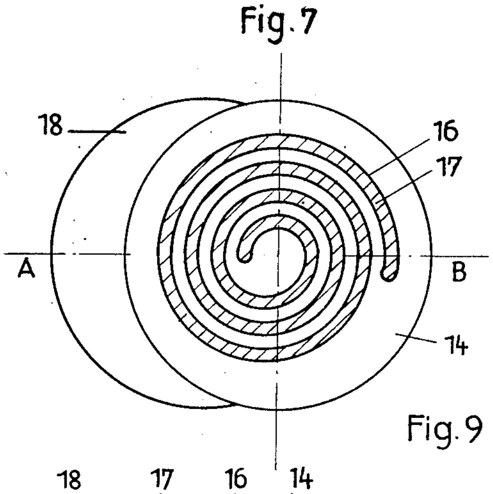
Figure 9A:
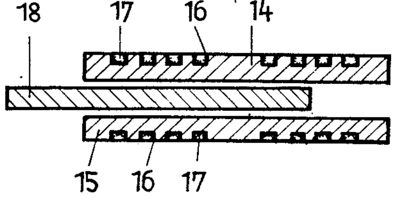

Figs. 6, 7, and 8 show three different embodiments of inductance components for oscillatory devices according to the invention, these embodiments being designed to permit an adjustment or control of the distributed coil capacitance;

Fig. 9 is a top view of another applicable inductance component also of controllable distributed capacitance, while Fig. 9*a* shows a corresponding cross section along the horizontal center plane of Fig. 9 denoted in Fig. 9 by A—B.

Figures 1, 2, 3, 3A, 4, 4A, 4B, 5:
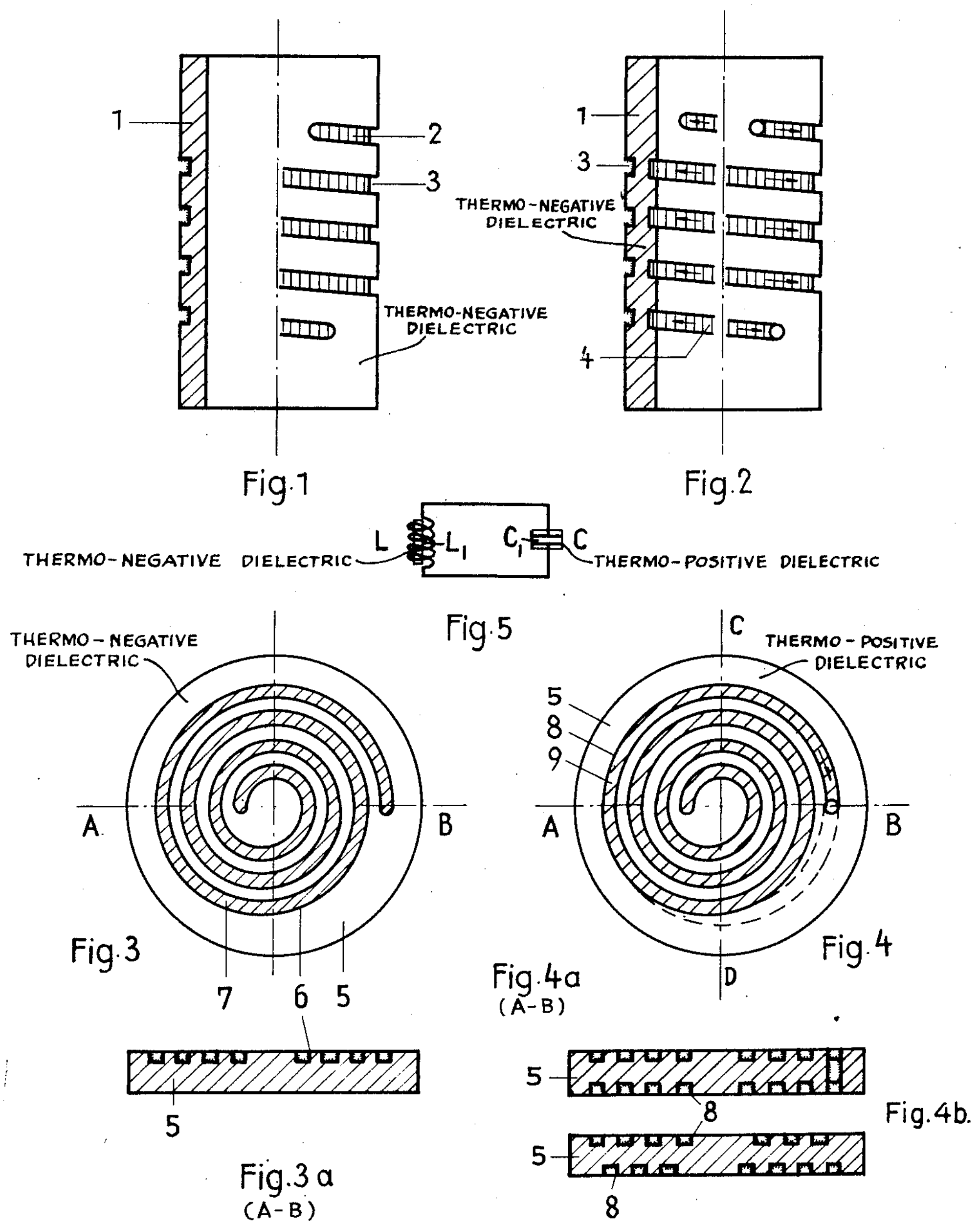

Referring first to Fig. 5, it will be recognized that in the illustrated oscillatory circuit a capacitance component C and an inductance component L are interconnected in a conventional manner. It is essential, however, that according to the invention the inductance component L has an appreciable distributed capacitance and is equipped with a dielectric body $L_1$ preferably forming the carrier for the coil conductor, which extends into the field of the distributed capacitance and consists of a material whose temperature coefficient changes in response to temperature in a sense opposite to the temperature responsive variation of the dielectric material between the electrodes of the capacitance component C. Preferably the dielectric C of the capacitor C has a positive temperature coefficient. It consists, for instance, of a ceramic magnesium silicate material. However, other capacitors having a positive temperature coefficient of the dielectric material are also applicable, for instance, mica capacitors. The provision of a positively temperature responsive dielectric in the capacitance component requires that the inductance component be equipped with a dielectric body with a negative temperature coefficient. Then, the variations in capacitance of component C due to changes in temperature are counteracted by changes in the distributed capacitance of the inductance component. As a result, the effect of temperature changes can be compensated, or the response of the oscillatory circuit device as a whole to changes in temperature can be made to follow a desired predetermined law. Oscillatory circuit devices according to the invention may, and usually do, form a component of more complex electronic tube circuits or other network and, while shown for voltage resonance, are also applicable in a capacitor-inductor series connection for current resonance. The capacitance component, as described above, may consist of conventional capacitors and hence need not be further described. However, for best results, the distributed capacitance of the inductance component should be higher than has been customary. Inductance components which satisfy this requirement will be described presently with reference to the other figures.

The inductance component shown in Fig. 1 has a coil carrier 1 shaped as a hollow cylinder and consisting of material whose temperature response is negative, for instance, of sintered titanium dioxide. The coil windings 2 are disposed in helical grooves 3 and consist preferably of fired coatings of noble metal. It will be understood that the coil windings 2 of the component just described (as well as the coils of the components according to the other inductor embodiments described hereinafter) is connected with a capacitor C with a temperature-positive dielectric as shown in Fig. 5 and described above, thus forming only one of the two essential components of the oscillatory circuit device according to the invention. The value of the distributed capacitance of the inductor winding must be rated in proper relation to the total capacitance of the oscillatory circuit device, including that of the capacitor C, to secure the desired temperature compensation.

The embodiment according to Fig. 2 has a rigid coil carrier 1 shaped as a hollow cylinder with helical exterior grooves 3 for receiving the coil turns. In addition, the interior surface of the cylindric carrier 1 is also equipped with a helical groove. This groove communicates through openings in the cylinder wall with the exterior groove 3 and has its surfaces also coated with the conductor metal, the inner and outer conductors being electrically interconnected with the same winding sense to form a continuous coil.

According to Figs. 3 and 3*a*, a coil carrier 5 is shaped as a flat disk. One of the disk surfaces has a spiral-shaped groove 6 coated with the coil conductor metal 7.

The coil structure shown in Figs. 4, 4*a* and 4*b* is similar to the just-mentioned embodiment except that the ceramic coil carrier 5 has spiral grooves 8 with coil conductors 9 on both sides, respectively, of the disk.

In the above-described embodiments as well as in those mentioned below, not only the bottom surface of the groove is metallized but preferably also the groove side walls. This aids in obtaining an increased distributed capacitance. The desired value of this capacitance is obtained by correspondingly dimensioning the groove, the pitch or spacing of its individual turns, and/or the wall thickness of the carrier. Also for obtaining a desired value of distributed capacitance, the wall thickness of the coil carrier can be suitably chosen, for instance, between that of a thin-walled cylinder and that of a full cylinder, or the inner or back surface of the coil carrier may be partly or fully metallized. For an increased value of distributed capacitance, the coil conductors, arranged on both sides of the carrier as in Fig. 2, 4 or 9, may be connected in parallel relation to each other.

The inductor according to Fig. 6 has a coil carrier 1 designed substantially in accordance with the above-described embodiment of Fig. 1 and consisting of a temperature-negative material such as sintered titanium dioxide. The distributed capacitance of this inductor is controllable by means of a hollow cylindrical dielectric body 10 which is inserted into the hollow coil carrier 1. The body 10 consists preferably of a ceramic material with a high dielectric constant, for instance, of a titanium dioxide containing mass.

The inductance component shown in Fig. 7 has within its coil carrier 1 an inner cylindric body 10 of a material with a high dielectric constant, and has also an exterior cylindric body 11 which surrounds the carrier 1 and consists also of a material with a high dielectric constant. The distributed capacitance of the coil is controllable and depends upon how far the two bodies 10 and 11 are inserted into the field of the distributed capacitance of the coil windings.

In the coil structure according to Fig. 8, the coil carrier 1 of ceramic material has the coil conductor 2 disposed on a male screw thread 12. An interiorly threaded hollow cylinder 13 is screwed onto the thread 12. The hollow cylinder 13 consists of a ceramic material with a high dielectric constant, and its position relative to carrier 1 determines the value of the distributed coil capacitance.

Fig. 9 shows a flat coil structure with two disk plates 14 and 15 of ceramic material whose exterior surfaces are equipped with grooves 16 which accommodate the metallic winding material 17. Another plate-shaped body 13 of a material with a high dielectric constant is inserted between the carrier plates 14 and 15. The degree of insertion determines the value of the distributed coil capacitance. The insert body in this embodiment as well as in those of Figs. 6, 7 and 8 may be partly or fully metallized.

Inductance components of the illustrated kind have the advantage that their distributed capacitance and its losses are well defined and hence follow temperature variations in accordance with a law of dependency sufficiently accurate for the temperature responsive effects desired in oscillator circuits according to the invention. Such inductors have also the advantage that the value of their distributed capacitance is sufficiently high to form an appreciable portion of the total capacitance of the oscillator circuit, thus readily permitting the self-regulating performance of devices according to the invention.

I claim:

1. An oscillatory electric circuit device of a predetermined frequency-temperature characteristic, comprising a capacitance component and an inductance component electrically connected with each other, said inductance component having appreciable distributed capacitance and having a dielectric material disposed in the field of said distributed capacitance, said capacitance component having another dielectric material, one of said two dielectric materials having a positive temperature coefficient of its dielectric constant and said other material having a corresponding negative coefficient, said capacitive component and said distributed capacitance of said inductance component having substantially balanced temperature-responsive capacitance variations respectively.

2. An oscillatory electric circuit device of a predetermined frequency-temperature characteristic, comprising a capacitor and an inductor electrically connected with each other, said capacitor having a dielectric with a positive temperature coefficient, said inductor having a coil carrier of dielectric material having a negative temperature coefficient, and said inductor having a distributed capacitance of a temperature dependence substantially compensating that of said capacitor.

3. An oscillatory electric circuit device of a predetermined frequency-temperature characteristic, comprising a capacitor and an inductor electrically connected with each other, said capacitor having a dielectric with a positive temperature coefficient, said inductor having distributed capacitance and a coil carrier of a rigid ceramic material with a negative temperature coefficient of its dielectric constant, said distributed capacitance having relative to the total capacitance of the oscillatory circuit device a value at which the positive temperature dependence of the capacitance of said capacitor is substantially compensated by the negative temperature dependence of said distributed capacitance of said inductor.

4. In a device according to claim 3, said coil carrier consisting essentially of ceramic titanium dioxide material.

5. In a device according to claim 3, said dielectric of said capacitor consisting essentially of a ceramic material.

6. In a device according to claim 3, said ceramic coil carrier having turns of grooves and having a metal coating on the bottom and side walls of said grooves forming a coil conductor, the dimensions and mutual spacial relation of said groove turns being selected in accordance with a desired value of said distributed capacitance.

7. In a device according to claim 3, said ceramic coil carrier having the shape of a hollow cylinder and having a helical groove at its exterior surface, and a coil conductor disposed in said groove.

8. In a device according to claim 3, said ceramic coil carrier having the shape of a hollow cylinder and having a helical groove at its exterior surface, a coil conductor in said groove, and a metal coating on at least part of the inner surface of said cylinder.

9. In a device according to claim 3, said ceramic coil carrier having the shape of a hollow cylinder and having a helical groove at its exterior surface and another helical groove at its interior surface, and a coil conductor extending through said two grooves.

10. In a device according to claim 3, said ceramic coil carrier having two coils disposed on opposite carrier sides respectively and electrically connected with each other for increased distributed capacitance.

11. A device according to claim 3, comprising a dielectric body of a material having a high dielectric constant and low dielectric losses, said body being adjacent said coil carrier displaceably inserted in the field of the distributed capacitance of said inductor for controlling the value of said distributed capacitance.

12. In a device according to claim 11, said body consisting of ceramic material having a negative temperature coefficient of its dielectric constant.

13. In a device according to claim 12, said body being at least partially metallized.

HEINZ GEORG KEHBEL.

REFERENCES CITED

The following references are of record in the file of this patent:

UNITED STATES PATENTS

| Number | Name | Date |
|---|---|---|
| 1,910,957 | Llewellyn | May 23, 1933 |
| 2,031,846 | Muth | Feb. 25, 1936 |
| 2,134,794 | Muth et al. | Nov. 1, 1938 |

OTHER REFERENCES

The Wireless World, No. 959, vol. XLIII, No. 2, January 13, 1938, page 37; article, "Designed to Prevent Frequency Drift in Pre-Tuned Receivers."